UNITED STATES PATENT OFFICE.

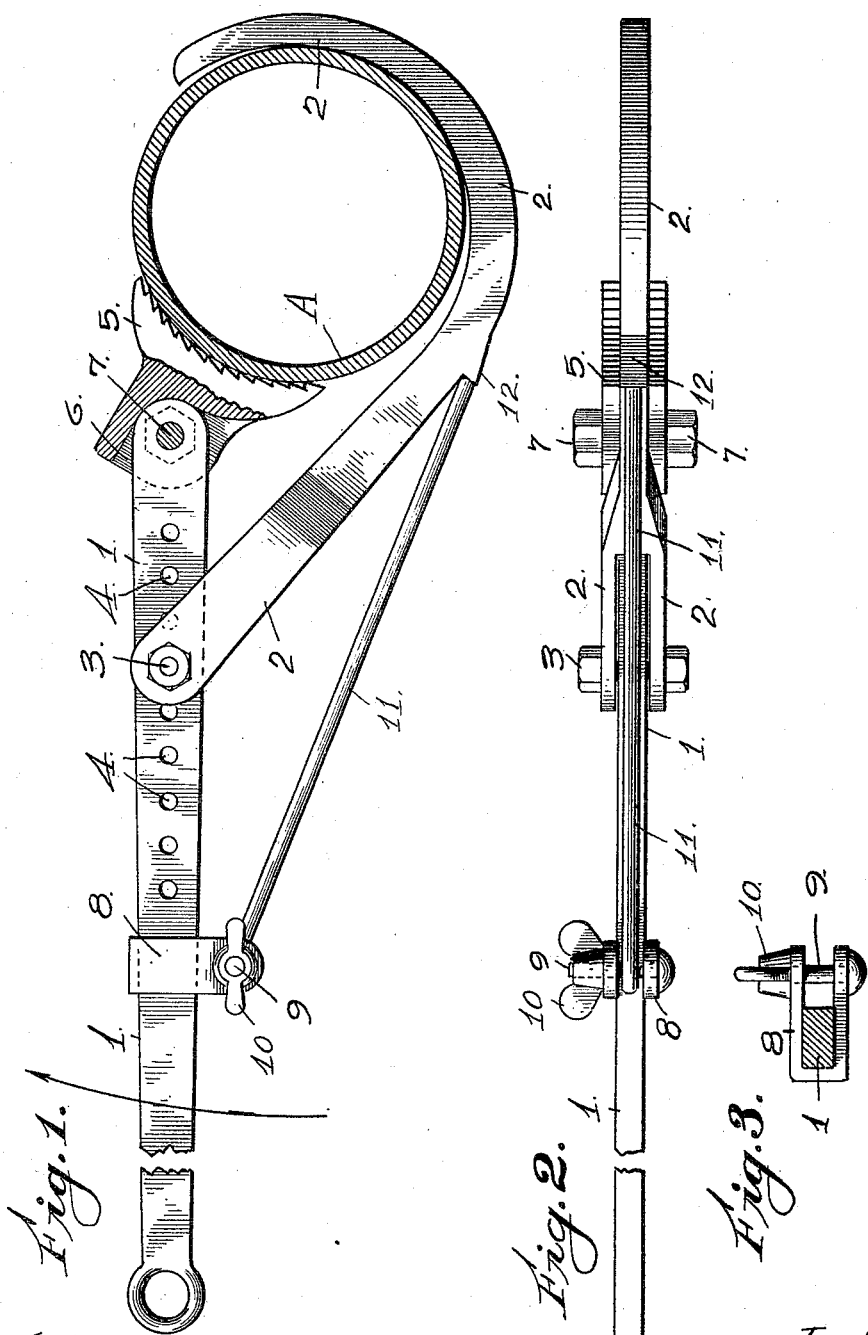

JAMES T. MARTIN, OF FELLOWS, CALIFORNIA.

PIPE-TONGS.

1,078,932. Specification of Letters Patent. Patented Nov. 18, 1913.

Application filed February 15, 1913. Serial No. 749,723.

*To all whom it may concern:*

Be it known that I, JAMES T. MARTIN, a citizen of the United States, residing at Fellows, county of Kern, and State of California, have invented a new and useful Improvement in Pipe-Tongs, of which the following is a specification.

My invention relates to pipe tongs wherein a lever is provided with a pivoted hook and a pivoted serrated member which are adapted to engage the pipe when turned in one direction and to release the same on the return movement, and its objects are, first, to provide a pipe tongs that may be adjusted for various sizes of pipe, and second, to provide means for maintaining the hook.

I accomplish these features by means of the device illustrated in the drawings forming a part of this specification, wherein like numerals of reference designate similar parts throughout the said specification and drawings, and in which—

Figure 1 is a broken plan view of the pipe tongs engaging a section of pipe. Fig. 2 is a side view of the tongs. Fig. 3 is a detail of the device for keeping the hook in position.

A lever 1 has a hook 2 pivotally secured thereto by means of the bolt 3 which engages one of the holes 4 within the lever 1. A plurality of holes 4 is provided so that the hook 2 may be shifted or detached and other hooks of a different size attached thereto for the accommodation of pipes of various diameters. A serrated member 5, having a hooded slot 6, is pivotally secured to the end of the lever 1 by means of the bolt 7. A clamp 8 is slidably secured to the lever 1 and is adapted to be clamped to the said lever 1 by means of the bolt 9 and thumb nut 10. A rod 11 is pivotally secured to the clamp 8 at one end, the other end thereof extending to and engaging a boss or lug 12 upon the back of the hook 2.

The operation of the pipe tongs may be readily understood from the following description. The pipe A to be turned, is placed in the hollow of the hook 2 as illustrated in Fig. 1 of the drawings. The hook 2 is then pivotally secured, by means of the bolt 3 to the aperture 4, that is best adapted to bring the several parts and principally the serrated member 5 into the position illustrated (Fig. 1).

In the operation of the tongs for pipes of large diameter, such as 10 and 12 inch pipes, the tongs are operated by means of a jerk line, not shown, which engages the eyelet in the outer end of the lever 1, the other end of the jerk line being attached to and operated by a donkey engine or other suitable means. With the smaller sizes of pipe the tongs may be hand operated. In either case, by moving the lever 1 in the direction indicated by the curved arrow in Fig. 1 of the drawings, the bolt 3 will act as a fulcrum of the said lever 1, causing the serrated member 5 to engage the pipe A within the hook 2 and turn the said pipe to the right or in the direction in which the hands of a watch are turned. By reversing the movement of the lever 1 the said lever again utilizes the bolt 3 as a fulcrum and the serrated member 5 is thereby caused to release the pipe A and the end of the rod 11 engages the lug 12 on the back of the hook 2 and moves the said hook around the pipe A to the left. When the lever is again moved to the right or in the direction indicated by the arrow, the lever 1 first causes the serrated member 5 to engage the pipe A and a continued movement in the direction indicated, causes the pipe to again move to the right as hereinbefore described.

The hooks 2 and the serrated member 5 may be made in various sizes for the accommodation and reception of various sizes of pipes. The serrated member 5 is provided with a hooded slot 6 so that the said member 5 will be prevented from moving outwardly beyond a straight line with the lever 1, but may move inwardly for the engagement of smaller sizes of pipe.

The adjustability of the hook 2 to various sizes of pipe is provided for by means of the plurality of apertures 4 within the shank of the lever 1. The clamp 8 is adapted to slide upon the shank of the lever 1 until the outer end of the rod 11 very nearly reaches the lug 12 on the back of the hook which is being used at the time. After the clamp 8 has been adjusted to its proper position on the lever 1, a turn of the thumb nut 10 will draw the bifurcations of the said clamp together which will rigidly secure the said clamp 8 to the lever 1. A slight clearance must be allowed between the end of the rod 11 and the lug 12 on the back of the hook 2, for the reason that the reverse movement of the lever 1 must first disengage the serrated member 5 from the pipe A before the hook can be moved backward without moving the said pipe also.

It is obvious from the foregoing that I have provided pipe tongs which are adapted to be adjusted to various sizes of pipe and means for maintaining the hook in position during the return movement without engaging the pipe.

The details of construction are so susceptible to change that I do not wish to confine myself to the precise construction or arrangement shown herein, but rather to avail myself of any modification that may fall properly within the scope of my invention.

Having thus described my invention what I claim as new and desire to secure by Letters Patent is;

A pipe tongs comprising a lever having a plurality of apertures therein; a serrated member pivotally secured to one end of the lever and adapted to engage the surface of a pipe when the lever to which it is secured is turned in one direction and to release the said pipe when the lever is turned in the opposite direction; a hook having a lug on the back portion thereof, pivotally secured to one of the apertures in the lever and adapted to hold a pipe against the serrations of the serrated member when the lever is turned in one direction only; a clamp slidably mounted upon the shank of the lever; means for securing the clamp to the lever; and means secured to the clamp and adapted to engage the lug on the back portion of the hook and to move the said hook around a pipe when the lever is turned in the opposite direction.

In witness whereof I hereunto set my signature in the presence of two subscribing witnesses.

JAMES T. MARTIN.

Witnesses:
JAMES F. McCUE,
E. BACON.

Copies of this patent may be obtained for five cents each, by addressing the "Commissioner of Patents, Washington, D. C."